Feb. 7, 1950     D. E. BRAMBLE     2,496,437
POWER-OPERATED BODY TOP
Filed May 7, 1947     3 Sheets-Sheet 1
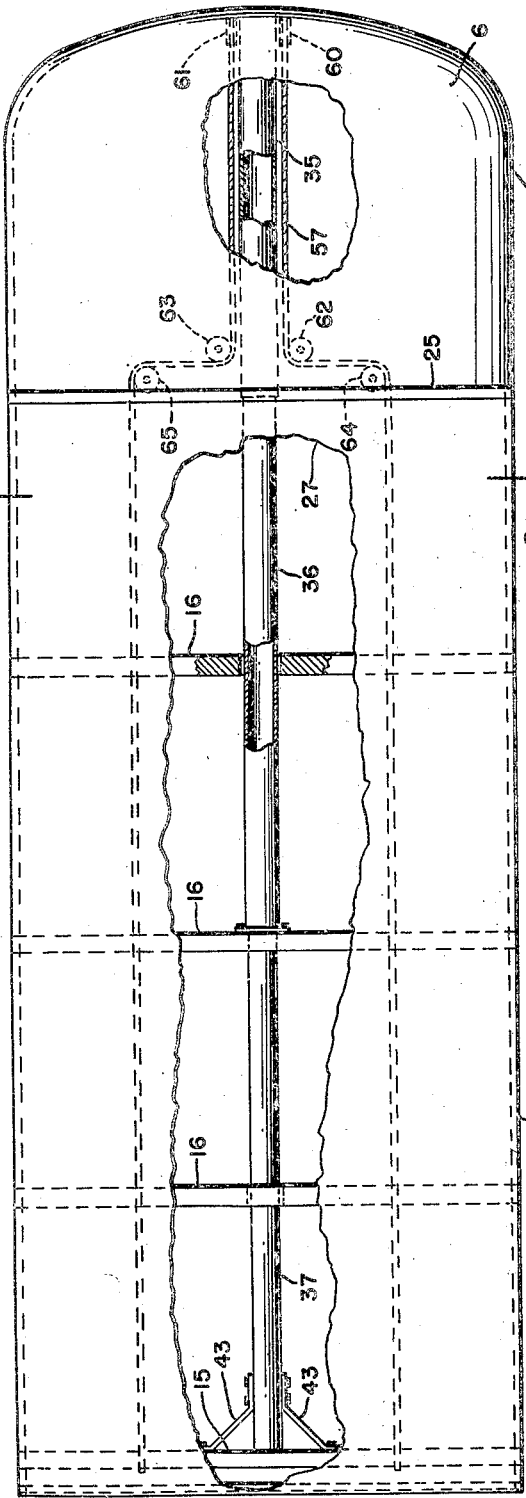
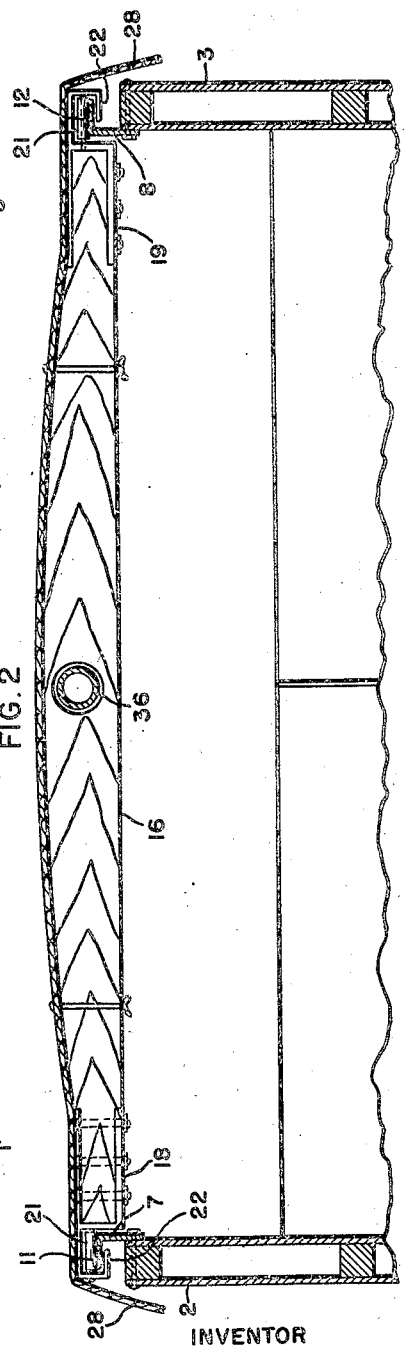
INVENTOR
DONALD EARL BRAMBLE
BY
HIS ATTORNEY Feb. 7, 1950 D. E. BRAMBLE 2,496,437
POWER-OPERATED BODY TOP
Filed May 7, 1947 3 Sheets-Sheet 2
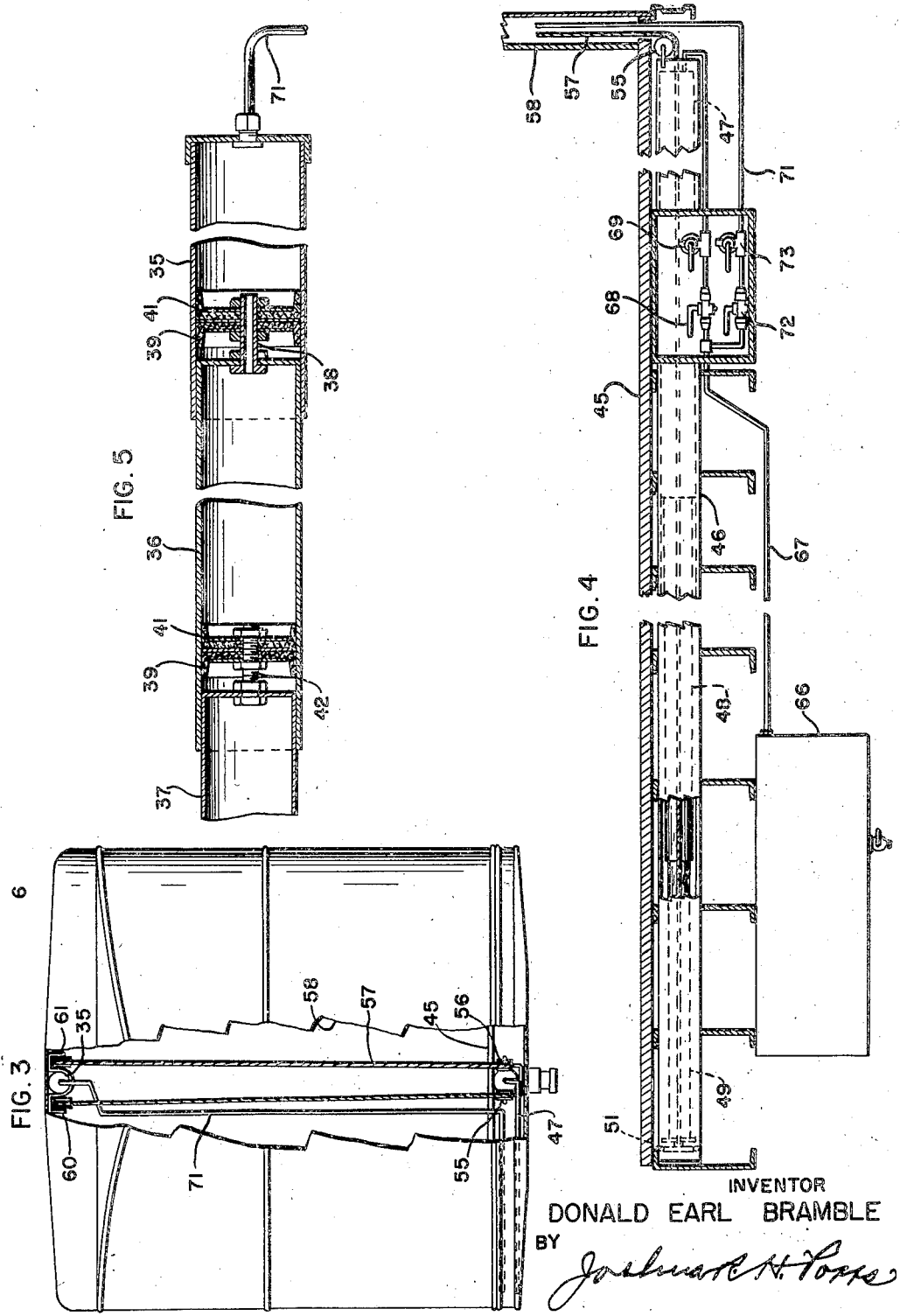
INVENTOR
DONALD EARL BRAMBLE
BY
HIS ATTORNEY Feb. 7, 1950          D. E. BRAMBLE          2,496,437
POWER-OPERATED BODY TOP
Filed May 7, 1947          3 Sheets—Sheet 3
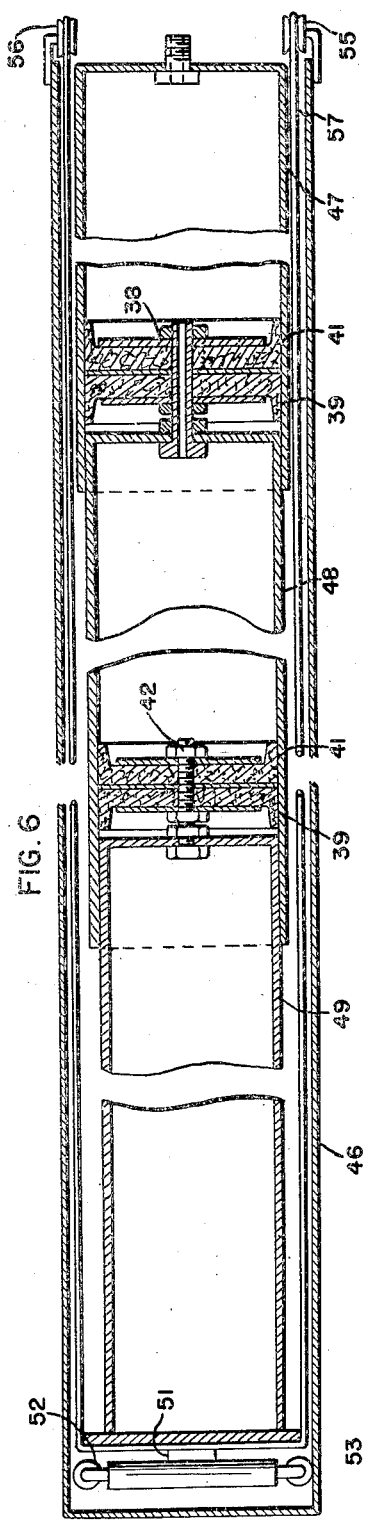
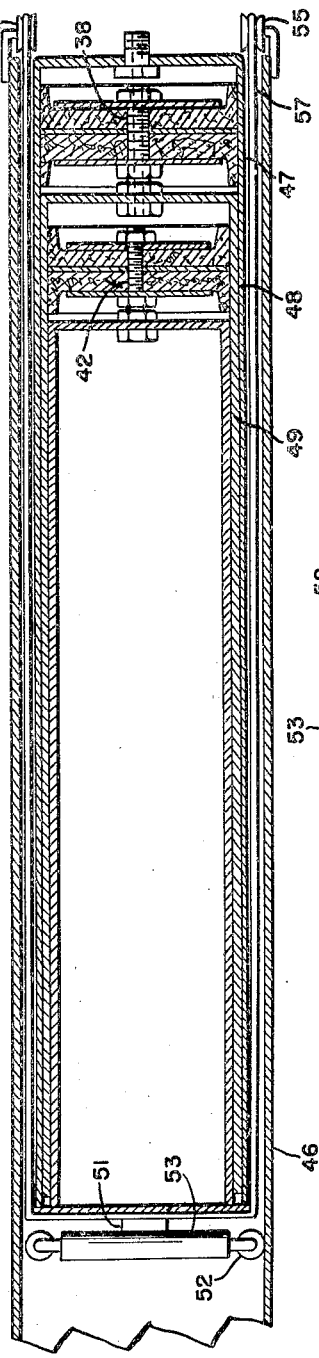
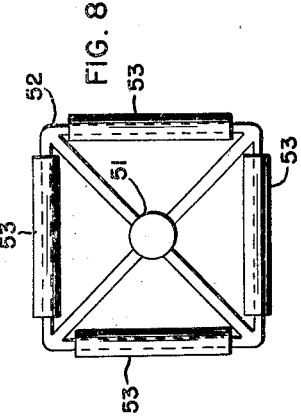
INVENTOR
DONALD EARL BRAMBLE
BY
*Joshua R. H. Potts*
HIS ATTORNEY Patented Feb. 7, 1950

2,496,437

UNITED STATES PATENT OFFICE 2,496,437

POWER-OPERATED BODY TOP

Donald E. Bramble, Chicago, Ill.

Application May 7, 1947, Serial No. 746,501

5 Claims. (Cl. 296—105)

1

The present invention relates to trailer or truck bodies, and relates in particular to a structure which may be employed as an open top or closed top body as desired.

In my Patent No. 2,406,737, issued September 3, 1946, I have illustrated and described a trailer body of this type in which a tarpaulin may be manipulated by cables to cover or uncover the top of a trailer body as described. The present invention is an improvement thereon and enables the application of fluid power for manipulating the tarpaulin as desired. Such fluid power means may be conveniently supplied from the pneumatic brake system of a truck, or in any suitable manner.

Accordingly, it is an object of the present invention to provide a vehicle body or the like having fluid power means for extending or retracting a covering over the top of the body.

Another object is the provision of a convertible vehicle body which may be quickly covered or uncovered as desired in a minimum amount of time.

A further object is the provision of a simplified convertible vehicle body, which may be smoothly and expeditiously operated by fluid power means.

Further objects and advantages will appear and be brought out more fully in the following specification, reference being had to the accompanying drawings, in which:

Figure 1 is a plan view with parts broken away of a vehicle body embodying the invention, Figure 2 is a section taken on line 2—2 of Figure 1, Figure 3 is a front elevation of Figure 1 as viewed from the right, with parts broken away, Figure 4 is a view partly in section of the lower fluid power operating mechanism, Figure 5 is a similar view of the upper fluid power operating mechanism, Figure 6 is an enlarged broken sectional view of the lower fluid power operating mechanism, showing the same in extended position, Figure 7 is a view similar to Figure 6 showing the operating mechanism contracted or collapsed, and Figure 8 is an end view of a detail.

Referring to the drawing, there is shown an open top trailer body 1 having side walls 2 and 3 which may be hollow, and a closed front end portion 5, having roof portion 6. Angle bars 7 and 8 are suitably secured to the interior side of the tops of the side walls, the horizontal flanges 11 and 12 thereof terminating short of the exterior of the walls. A plurality of cross bows comprising an end member 15 and intermediate members 16 carry brackets 18, 19 at their ends, said brackets comprising channel portions in which are journalled rollers 21 bearing on the horizontal flanges 11 and 12 of the side walls, so as to support

2 the cross bows thereon. The brackets 18, 19 have inturned ends 22 to prevent the cross bows from lifting off the flanges 11, 12.

The rear of the roof 6 has an angle bar 25 to which is suitably secured one edge of a tarpaulin 27 which extends over the open top of the body and is suitably secured to the cross bows. The tarpaulin may have overhanging side portions 28. The structure so far described is shown in greater detail in my Patent No. 2,406,737, the disclosure of which is made a part hereof.

Suitably secured to the roof of the end portion 5 is a tube 35 (Figs. 1 and 5) which receives telescopically therein a tube 36 and which in turn telescopically receives the tube 37. As shown in Figure 5, tube 36 carries in its end a hollow threaded sleeve 38 upon which is suitably secured the reversely cupped leather washers 39, 41, which provide a sealed sliding fit, so that tube 36 acts as a piston in tube 35. The end of tube 37 carries a bolt 42 and similar sealing washers 39, 41, and tube 37 in turn acts as a piston in tube 36. In the preferred embodiment, tubes 36 and 37 pass through the cross bows 16 and may serve as ridge poles, the end bow 15 being suitably secured to tube 37 by braces 43 or the like.

Below the floor 45 of the trailer body is suitably mounted a channel member 46, which may be square in cross section, and a tube 47 is suitably mounted within this channel. A tube 48 is telescopically received within tube 47 and acts as a piston therein, and a tube 49 within tube 48 acts as a piston in the latter. Tube 48 has internal communicating and sealing means similar to the threaded sleeve 38 and sealing washers 39, 41, and tube 49 carries a bolt similar to bolt 42 and its sealing washers. Tube 49 carries at its end a bracket 51 upon which is mounted a rectangular frame 52 carrying rollers 53 which engage the sides of channel 46 to guide the tubes 48 and 49 for longitudinal movement therein. Channel 46 carries sheaves 55, 56 suitably journalled thereon, and a cable 57 secured to the end of tube 49 passes under these sheaves and upward within the front wall 58 of the trailer body to the top, then over sheaves 60, 61 at the top, around sheaves 62, 63 and 64, 65, and is suitably fastened to the rear bow 15.

A compressed air tank 66 (Fig. 4) beneath the trailer floor may serve as a source of supply of fluid under pressure. This tank may be a part of the pneumatic brake system of the trailer or may be a specially provided tank. A pressure supply conduit 67 having a control valve 68 and a bleeder valve 69 therein is connected to the end of lower tube 47, and a branch supply conduit 71 having a control valve 72 and a bleeder valve 73 therein is connected to the end of upper tube 35.

The operation of the invention now will be described as actuated by compressed air from the tank 66. Assuming the top tubes 35, 36 and 37 to be in extended position as shown in Figure 1, with the tarpaulin extended over the top of the trailer body, the bottom tubes 47, 48 and 49 will be in collapsed position as shown in Figure 7. When it is desired to retract the tarpaulin, valve 72 is closed and valve 73 is turned to open position to bleed the air from tubes 35 and 36 through conduit 71 and through this valve to the atmosphere. Bleeder valve 69 now is closed and valve 68 is opened to supply air to the interior of tubes 47 and 48 which causes these tubes to extend and draw with them cable 57, which in turn successively draws bows 15 and 16 to the forward part of the body to uncover the body. This action causes collapse or telescoping of tube 37 within tube 36 and tube 36 within tube 35, the air escaping therefrom by bleed valve 73, and the tarpaulin meanwhile being drawn forward in folds. When it is desired to cover the body, valve 68 is closed, bleeder valve 69 is opened to atmosphere and bleeder valve 73 is closed, then valve 72 is opened. This supplies air to the top tubes 35 and 36 causing them to extend and carry along bows 15 and 16 and the tarpaulin across the top of the body to cover the same.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variation and modifications as come within the scope of the appended claims.

Having thus described my invention, what I claim as new and desire to secure by Letters Patent is:

1. In combination with a vehicle body having a so-called open top, sides extending to substantially the top of the body, a permanent front end structure, a tarpaulin having its front edge anchored to said structure, cross bows having members movable along the top of such sides and means associated therewith to prevent lateral and upward displacement of the cross bows, connections between the cross bows and the tarpaulin, a collapsible telescopic ridge-pole, hydraulically expansible longitudinally of such body, having sections attached to and movable with certain of the bow members to extended positions, one end of said ridge-pole being fixed to said structure, an auxiliary hydraulic means operatively connected to the bow member most remote from the permanent front end structure for collapsing the ridge-pole as desired in moving said bows and tarpaulin to retracted position, and a single supply source of fluid under pressure communicatable hydraulically with either said ridge pole or said auxiliary means as desired.

2. In combination with a vehicle body having a so-called open top and a tarpaulin means one end of which is anchored to one end of such vehicle, said tarpaulin means being expansible to top covering position and retractable to top open position, an actuating means associated with said tarpaulin and serving to expand and retract said tarpaulin as desired, said actuating means consisting of a pair of hydraulically and selectively expansible telescopic cylinder means each having a fixed end and a free end, said fixed ends being mounted to such vehicle, and an operating connection reversely associating said free ends and serving to retract either by the expansion of the other.

3. In combination with a vehicle body having a so-called open top and a tarpaulin means one end of which is anchored to one end of said vehicle, said tarpaulin means being expansible to top covering position and retractable to top open position, an actuating means associated with said tarpaulin and serving to expand and extract said tarpaulin as desired, said actuating means consisting of a pair of hydraulically expansible telescopic cylinder means one end of each being mounted to said one end of said vehicle, both of said cylinder means being adapted to expand toward the other end of said vehicle, a pulley means carried by said one end of said vehicle, and a cable means secured to the other end of each of said cylinder means and threaded about said pulley means, and serving to retract either of said cylinder means when the other is expanded.

4. In combination with a vehicle body having an open top, a tarpaulin adapted to be expanded into top closing position and retracted to top open position, one end of said tarpaulin being anchored to one end of said top, a plurality of top bows confined to said vehicle, said bows being shiftable laterally in a direction longitudinal of said top and being spaced apart when said tarpaulin is expanded and substantially together when it is retracted, an hydraulically expansible telescopic ridge-pole means mounted to said one end of said top so as to be expansible toward the other end, said ridge pole means having telescopic sections connected directly with respective ones of said bows and serving to shift said bows to spaced position in expanding said tarpaulin, another hydraulically expansible telescopic means associated with and operable in opposition to said ridge-pole means and serving to telescope said ridge-pole means in shifting said bows with said tarpaulin to retracted positions, and a conduit system connecting the two telescopic means with a source of fluid under pressure said conduit means including valves for selectively applying such fluid.

5. In combination with a vehicle body having a so-called open top, sides extending to substantially the top of the body, a permanent front end structure, a tarpaulin having its frone edge anchored to said permanent front end structure, cross bows having members movable along the top of said sides and means associated therewith to prevent lateral and upward displacement of the cross bows, connections between the cross bows and the tarpaulin, a collapsible telescopic ridge-pole hydraulically extensible longitudinally of such body at the bows and having sections movable with certain ones of said bows to spaced positions, one end of said ridge pole being fixed to said structure, and means connected to the other end of said ridge-pole by which it is collapsed in moving said bows and tarpaulin to retracted position.

DONALD E. BRAMBLE.

REFERENCES CITED

The following references are of record in the file of this patent:

UNITED STATES PATENTS

| Number | Name | Date |
|---|---|---|
| 1,321,913 | Hedges | Nov. 18, 1919 |
| 2,045,344 | Deutsch et al. | June 23, 1936 |
| 2,362,939 | Simpson | Nov. 14, 1944 |
| 2,406,737 | Bramble | Sept. 3, 1946 |